(12) United States Patent
Naito (10) Patent No.: US 11,680,911 B2
(45) Date of Patent: Jun. 20, 2023

(54) MARKING INSPECTION DEVICE, MARKING INSPECTION METHOD AND ARTICLE INSPECTION APPARATUS

(71) Applicant: SCREEN HOLDINGS CO., LTD., Kyoto (JP)

(72) Inventor: Shun Naito, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 264 days.

(21) Appl. No.: 17/261,791

(22) PCT Filed: May 22, 2019

(86) PCT No.: PCT/JP2019/020192
§ 371 (c)(1),
(2) Date: Jan. 20, 2021

(87) PCT Pub. No.: WO2020/021832
PCT Pub. Date: Jan. 30, 2020

(65) Prior Publication Data
US 2021/0342618 A1 Nov. 4, 2021

(30) Foreign Application Priority Data
Jul. 27, 2018 (JP) .............................. JP2018-140938

(51) Int. Cl.
*G01N 21/95* (2006.01)
*G01N 21/88* (2006.01)
(Continued)

(52) U.S. Cl.
CPC ......... *G01N 21/9515* (2013.01); *G01N 21/88* (2013.01); *G06V 30/1448* (2022.01);
(Continued)

(58) Field of Classification Search
USPC ........................................ 382/181, 141, 182
See application file for complete search history.

(56) References Cited

U.S. PATENT DOCUMENTS 5,627,911 A * 5/1997 Inumaru .............. G06V 10/993
382/141
2004/0246476 A1* 12/2004 Bevis ................... G01N 21/474
356/237.5
(Continued)

FOREIGN PATENT DOCUMENTS

JP      03-204792 A    9/1991
JP      07-131779 A    5/1995
(Continued)

OTHER PUBLICATIONS

Extended European Search Report issued in corresponding European Patent Application No. 19841831.1-1210, dated Aug. 1, 2022.
(Continued)

*Primary Examiner* — Kathleen Y Dulaney
(74) *Attorney, Agent, or Firm* — McDermott Will & Emery LLP (57) ABSTRACT

A marking region image is obtained by cutting out the part corresponding to a marking region from an article image obtained by imaging an article to be inspected. Then, whether or not the marking is properly provided is determined by performing a character recognition of a marking part for a marking region image. Further, an image of an article having no marking and no defect is stored as a reference image, whereas a marking periphery image obtained by removing the image of the marking part from the marking region image is compared to the reference image. By that comparison, whether or not any defect is included in the marking peripheral part of the marking region except the marking part is determined.

8 Claims, 8 Drawing Sheets

(51) Int. Cl.
    *G06V 30/14*     (2022.01)
    *G06V 30/19*     (2022.01)
    *G06V 30/10*     (2022.01)

(52) U.S. Cl.
    CPC ........ *G06V 30/19013* (2022.01); *G06V 30/10* (2022.01); *G06V 30/141* (2022.01)

(56) References Cited

U.S. PATENT DOCUMENTS

| | | | |
|---|---|---|---|
| 2007/0115464 A1* | 5/2007 | Harding | G01N 21/958 356/239.2 |
| 2007/0116350 A1* | 5/2007 | Cheverton | G06T 7/33 382/151 |
| 2010/0226561 A1* | 9/2010 | Fujikawa | G06T 7/0004 382/141 |
| 2014/0355864 A1 | 12/2014 | Truong et al. | |
| 2015/0355104 A1* | 12/2015 | Matsuda | G06T 7/586 356/237.2 |
| 2015/0358602 A1* | 12/2015 | Mayumi | H04N 23/56 348/46 |
| 2017/0098300 A1* | 4/2017 | Mayumi | G01N 21/8806 |
| 2017/0307544 A1 | 10/2017 | Nagata | |
| 2018/0293732 A1* | 10/2018 | Oki | G06T 7/001 |
| 2020/0173933 A1* | 6/2020 | Tada | G01N 21/8803 |

FOREIGN PATENT DOCUMENTS

| | | |
|---|---|---|
| JP | 2001-126064 A | 5/2001 |
| JP | 2016-057075 A | 4/2016 |
| TW | 201305969 A | 2/2013 |

OTHER PUBLICATIONS

Taiwanese Office Action issued in corresponding Taiwanese Patent Application No. 108118996, dated Dec. 27, 2019, with English translation.

International Search Report issued in corresponding International Patent Application No. PCT/JP2019/020192, dated Aug. 13, 2019, with English translation.

* cited by examiner

MARKING INSPECTION DEVICE, MARKING INSPECTION METHOD AND ARTICLE INSPECTION APPARATUS

CROSS REFERENCE TO RELATED APPLICATIONS

This application is the U.S. National Phase under 35 US.C. § 371 of International Application No. PCT/JP2019/020192, filed on May 22, 2019, which claims the benefit of Japanese Application No. 2018-140938, filed on Jul. 27, 2018, the entire contents of each are hereby incorporated by reference.

TECHNICAL FIELD

This invention relates to marking inspection device and apparatus for inspecting a marking region including a marking part where a marking is made on a surface of an article, and an article inspection apparatus equipped with the marking inspection device for inspecting an article.

BACKGROUND ART

A device is known which inspects a three-dimensional article such as a metal part, a resin part or a rubber part based on a plurality of images obtained by imaging the article from various angles. For example, in an inspection device of patent literature 1, a metal part formed by forging or casting (e.g. automotive part) is an article to be inspected, and a plurality of light sources are provided to irradiate light from a plurality of directions to the article held by a stage. Two types of images are obtained while a lighting mode of the light sources is switched, and whether or not there is any concave or convex defect on a surface of the article is determined from those images.

CITATION LIST

Patent Literature

Patent Literature 1: JP 2016-57075A

SUMMARY OF INVENTION

Technical Problem

A marking of characters (including alphanumeric, hiragana, katakana, kanji, symbols and the like in this specification) may be made on an article to specify or identify the article to be inspected. Since various recesses and projections are formed on the surface of the article in a marking part where a plurality of types of markings are made, if the marking part is inspected as it is by the device described in patent literature 1, the markings may be erroneously recognized as defects. Thus, measures such as the one not to inspect a certain range including the marking part (hereinafter, referred to as a "marking region"), out of the surface of the article, have been employed.

However, the marking has an article specifying function and an article identifying function as described above, and it is important to inspect whether or not the marking is properly provided. Further, since there is a possibility of a defect in the marking region, it is also important to inspect whether or not any defect is included in the marking region in enhancing article inspection accuracy.

This invention was developed in view of the above problem and aims to provide marking inspection device and method capable of accurately inspecting a marking region including a marking part where a marking is made on a surface of an article, and an article inspection apparatus capable of accurately inspecting an article, including a marking region.

Solution to Problem

A first aspect of the invention is a marking inspection device for inspecting a marking region including a marking part where a marking for specifying an article is made, out of a surface of the article, the device comprising: a reference image storage that stores an image of an article having no marking and no defect as a reference image; an imager that images the article; a marking determiner that obtains a marking region image by cutting out a part corresponding to the marking region from an article image obtained by imaging the article to be inspected by the imager and determines whether or not the marking is properly provided by performing character recognition of the marking part for the marking region image; and a marking periphery determiner that determines whether or not any defect is included in a marking peripheral part except the marking part, out of the marking region, by comparing a marking periphery image obtained by removing an image of the marking part from the marking region image to the reference image.

A second aspect of the invention is a marking inspection method for inspecting a marking region including a marking part where a marking for specifying an article is made, out of a surface of the article, the method comprising: generating an image of an article having no marking and no defect as a reference image and storing the reference image in a reference image storage; obtaining an article image by imaging the article to be inspected; obtaining a marking region image by cutting out a part corresponding to the marking region from the article image; determining whether or not the marking is properly provided by performing character recognition of the marking part for the marking region image; and determining whether or not any defect is included in a marking peripheral part except the marking part, out of the marking region, by comparing a marking periphery image obtained by removing an image of the marking part from the marking region image to the reference image.

A third aspect of the invention is an article inspection apparatus for inspecting an article having a marking made on a part of a surface, comprising: a reference image storage that stores an image of an article having no marking and no defect as a reference image; an imager that images the article; a marking determiner that obtains a marking region image by cutting out a part corresponding to a marking region including a marking part where the marking is made from an article image obtained by imaging the article to be inspected by the imager and determines whether or not the marking is properly provided by performing character recognition of the marking part for the marking region image; a marking periphery determiner that determines whether or not any defect is included in a marking peripheral part except the marking part, out of the marking region, by comparing a marking periphery image obtained by removing an image of the marking part from the marking region image to the reference image; and a non-marking region determiner that obtains a non-marking region image corresponding to a non-marking region except the marking region, out of the article, and determines whether or not any defect is included in the non-marking region by comparing the non-marking region image and the reference image.

In the invention thus configured, the marking region image is obtained by cutting out the part corresponding to the marking region from the article image obtained by imaging the article to be inspected. Then, whether or not the marking is properly provided is determined by performing the character recognition of the marking part for the marking region image. Further, the image of the article having no marking and no defect is stored as the reference image in the reference image storage, whereas the marking periphery image obtained by removing the image of the marking part from the marking region image is compared to the reference image. By that comparison, whether or not any defect is included in the marking peripheral part of the marking region except the marking part is determined.

Effect of Invention

As described above, according to the invention, the marking region image corresponding to the marking region including the marking part where the marking is made is obtained and the marking and the marking peripheral part are respectively inspected based on the marking region image. Thus, the marking region including the marking part where the marking is made on the surface of the article can be accurately inspected.

All of a plurality of constituent elements of each aspect of the invention described above are not essential and some of the plurality of constituent elements can be changed, deleted or replaced by new other constituent elements or limitation contents can be partially deleted as appropriate to solve some or all of the problems described above or achieve some or all of effects described in this specification. Further, some or all of technical features included in one aspect of the invention described above can be combined with some or all of technical features included in another aspect of the invention described above into one independent aspect of the invention to solve some or all of the problems described above or achieve some or all of effects described in this specification.

DESCRIPTION OF EMBODIMENTS

Figure 1:
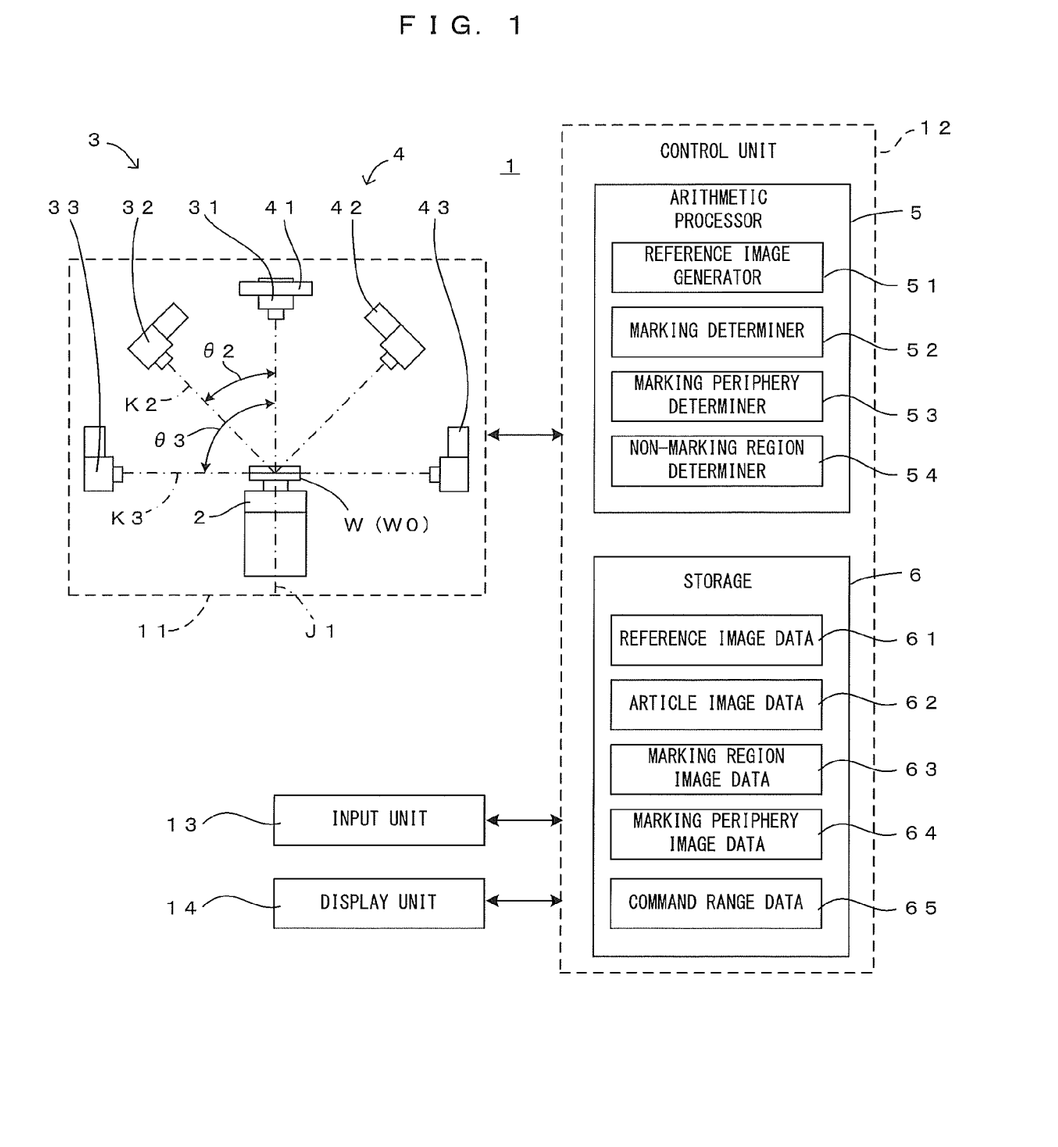
FIG. 1 is a diagram showing the configuration of an article inspection apparatus equipped with a first embodiment of a marking inspection device according to the invention.
Figure 2:
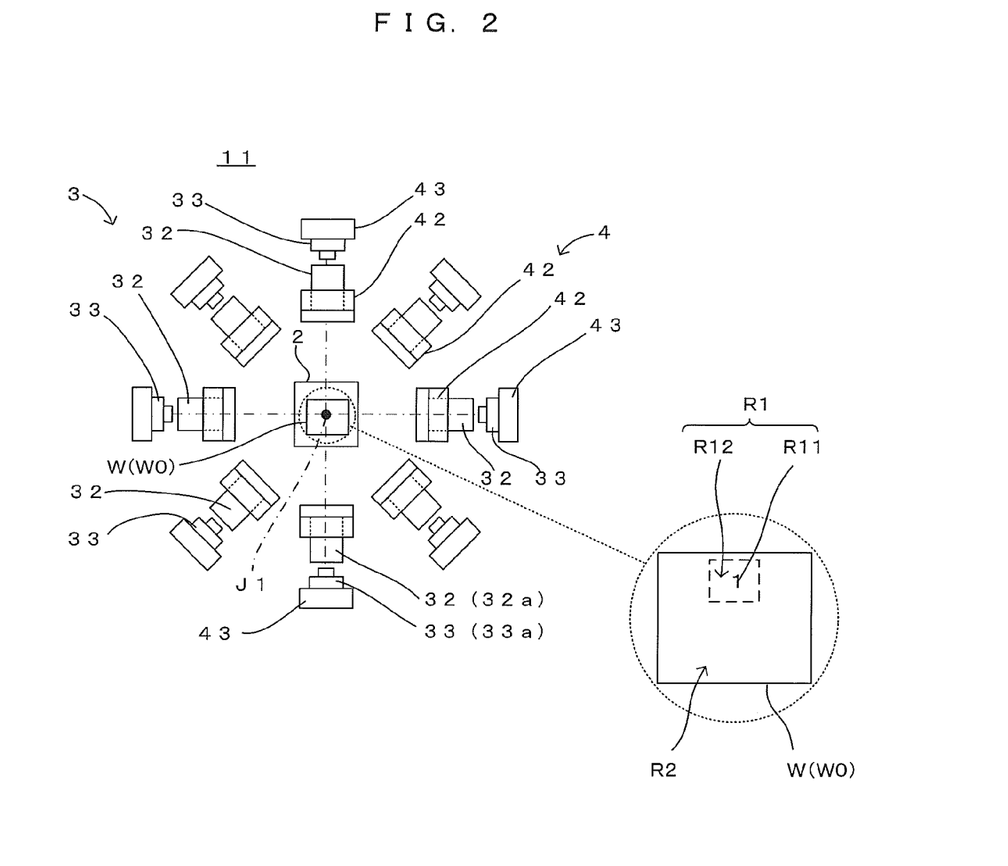
FIG. 2 is a plan view showing a body of the article inspection apparatus shown in FIG. 1.

FIG. 1 is a diagram showing the configuration of an article inspection apparatus equipped with a first embodiment of a marking inspection device according to the invention. FIG. 2 is a plan view showing a body of the article inspection apparatus shown in FIG. 1. The article inspection apparatus 1 is an apparatus for performing three types of inspections (marking inspection, marking periphery inspection, non-marking region inspection) from an article image obtained by imaging an article W made of metal and manufactured, for example, by forging or casting.

As shown in FIG. 1, the article inspection apparatus 1 includes a body 11, a control unit 12 constituted by a computer, an input unit 13 including a keyboard, a mouse and the like for giving various pieces of data, commands and the like to the control unit 12, and a display unit 14 for displaying a frame line or the like for instructing an article image or a marking region as described later. In this article inspection apparatus 1, the body 11 includes a stage 2, an imaging unit 3 and a light source unit 4. The article W is placed on the stage 2. Further, the body 11 is provided with an unillustrated shading cover for preventing external light from reaching the stage 2, and the stage 2, the imaging unit 3 and the light source unit 4 are provided in the shading cover.

As shown in FIGS. 1 and 2, the imaging unit 3 includes one upper imager 31, eight oblique imagers 32 and eight lateral imagers 33. In FIG. 2, the upper imager 31 is not shown (an upper light source 41 to be described later is also not shown). As shown in FIG. 1, the upper imager 31 is arranged on a center axis J1 extending vertically upward from a center of the stage 2 above the stage 2, and outputs an original image captured by imaging the upper surface of the article W on the stage 2 from right above thereby to the control unit 12.

As shown in FIG. 2, when the body 11 is viewed downward from above (i.e. in a plan view of the body 11), the eight oblique imagers 32 are arranged around the stage 2. The eight oblique imagers 32 are arrayed at an angular interval (pitch) of 45° in a circumferential direction about the center axis J1. In a plane including an imaging optical axis K2 of each oblique imager 32 and the center axis J1 (see FIG. 1), an angle θ2 between the imaging optical axis K2 and the center axis J1 is approximately 45°. An original image captured by imaging the article W on the stage 2 obliquely from above can be obtained by each oblique imager 32.

In the plan view of the body 11, eight lateral imagers 33 are also arranged around the stage 2 similarly to the eight oblique imagers 32. The eight lateral imagers 33 are arrayed at an angular interval of 45° in a circumferential direction about the center axis J1. In a plane including an imaging optical axis K3 of each lateral imager 33 and the center axis J1, an angle θ3 between the imaging optical axis K3 and the center axis J1 is approximately 90°. An original image captured by laterally imaging the article W on the stage 2 can be obtained by each lateral imager 33. Each of the upper imager 31, the oblique imagers 32 and the lateral imagers 33 includes, for example, a CCD (Charge Coupled Device), a CMOS (Complementary Metal-Oxide Semiconductor) or the like and obtains a multi-gradation image. The upper imager 31, the oblique imagers 32 and the lateral imagers 33 are supported by an unillustrated support.

The light source unit 4 includes one upper light source 41, eight oblique light sources 42 and eight lateral light sources 43. The upper light source 41 is such a light source that a plurality of LEDs (Light-Emitting Diodes) are arrayed in a ring centered on the center axis J1. The ring-shaped upper light source 41 is fixed to the upper imager 31 to surround the upper imager 31. Illumination light can be irradiated to the article W on the stage 2 along a direction parallel to the center axis J1 from right above by the upper light source 41.

In the plan view of the body 11, the eight oblique light sources 42 are arranged around the stage 2. The eight oblique light sources 42 are arrayed at an angular interval of 45° in a circumferential direction about the center axis J1. Each lateral light source 42 is such a light source that a plurality of LEDs are arrayed in a bar extending in a direction tangential to a circumference about the center axis J1. If a line connecting a center of a light emission surface of each oblique light source 42 and (a center of) the article W is called an "oblique illumination axis", an angle between the oblique illumination axis and the center axis J1 is approximately 45° in a plane including the oblique illumination axis of this oblique light source 42 and the center axis J1. In each oblique light source 42, illumination light can be irradiated to the article W on the stage 2 obliquely from above along the oblique illumination axis. In the article inspection apparatus 1, each oblique light source 42 is fixed to the oblique imager 32.

In the plan view of the body 11, eight lateral light sources 43 are also arranged around the stage 2. The eight lateral light sources 43 are arrayed at an angular interval of 45° in a circumferential direction about the center axis J1. Each lateral light source 43 is such a light source that a plurality of LEDs are arrayed in a bar extending in a direction tangential to a circumference about the center axis J1. Similarly to the oblique light source 42, if a line connecting a center of a light emission surface of each lateral light source 43 and the center of the article W is called a "lateral illumination axis", an angle between the lateral illumination axis and the center axis J1 is approximately 90° in a plane including the lateral illumination axis of this lateral light source 43 and the center axis J1. In each oblique light source 43, illumination light can be irradiated to the article W on the stage 2 laterally along the lateral illumination axis. In the article inspection apparatus 1, each oblique light source 43 is fixed to the lateral imager 33.

As just described, in this embodiment, seventeen light sources (=one upper light source 41+eight oblique light sources 42+eight lateral light sources 43) are disposed to surround the stage 2 in a dome manner, and illumination light can be irradiated to the article W from all or some of seventeen irradiation directions different from each other. For example, a distance from the upper imager 31 and the upper light source 41 to the article W is about 55 cm (centimeters). Further, a distance from the oblique imagers 32 and the oblique light sources 42 to the article W is about 50 cm, and a distance from the lateral imagers 33 and the lateral light source 43 to the article W is about 40 cm. Another type of light sources other than LEDs may be used in the upper light source 41, the oblique light sources 42 and the lateral light sources 43.

In this embodiment, the control unit 12 is provided to control each part of the body 11 and inspect the article W by comparing an article image of the article W and a reference image as described later. The control unit 12 includes an arithmetic processor 5 constituted by a CPU (Central Processing Unit), and a storage 6 for storing various pieces of data such as reference image data 61, article image data 62, marking region image data 63, marking periphery image data 64 and command range data 65, a program and the like. The arithmetic processor 5 obtains a plurality of article images while switching illumination light to the article W in multiple stages by controlling each component of the apparatus in accordance with the above program. Further, the arithmetic processor 5 applies various image processings to the article images and performs a marking determination process for determining whether or not a marking is properly provided, a marking periphery determination process for determining whether or not any defect is included in a marking peripheral part and a non-marking region determination process for determining whether or not any defect is included in a non-marking region excluding the marking region. The article W is comprehensively inspected by performing these three types of determination processes. Further, reference images used in performing the above determinations are generated by the arithmetic processor 5. As just described, the arithmetic processor 5 functions as a reference image generator 51, a marking determiner 52, a marking periphery determiner 53 and a non-marking region determiner 54.

The non-marking region determiner 54 inspects the non-marking region (region other than the marking region) similarly to the device described in patent literature 1. That inspection is summarized as follows. A first article image is obtained by an imager by the irradiation of light from one of a plurality of light sources, and a second article image is obtained by the imager by the irradiation of light from the plurality of light sources. Further, a first defect candidate region is detected by comparing the first article image and a first reference image corresponding to the first article image, and a second defect candidate region is detected by comparing the second article image and a second reference image corresponding to the second article image. A region overlapping in the first and second defect candidate regions is specified as a defect region in a target region. In this way, a false detect region in the first and second defect candidate regions due to minute recesses and projections on the surface of the article W is properly removed and a defect (true defect) on the surface of the article W is accurately detected.

Here, the first and second reference images need to be generated and stored in the storage 6 in advance. Further, as described in detail later, the first and second reference images are used in the marking periphery determination process. Accordingly, in this embodiment, before inspecting the article W, the arithmetic processor 5 inspects the article W as an inspection target after the first and second reference images are generated, using a marked article including no defect, i.e. a good article, as shown in FIG. 3.

Figure 3:
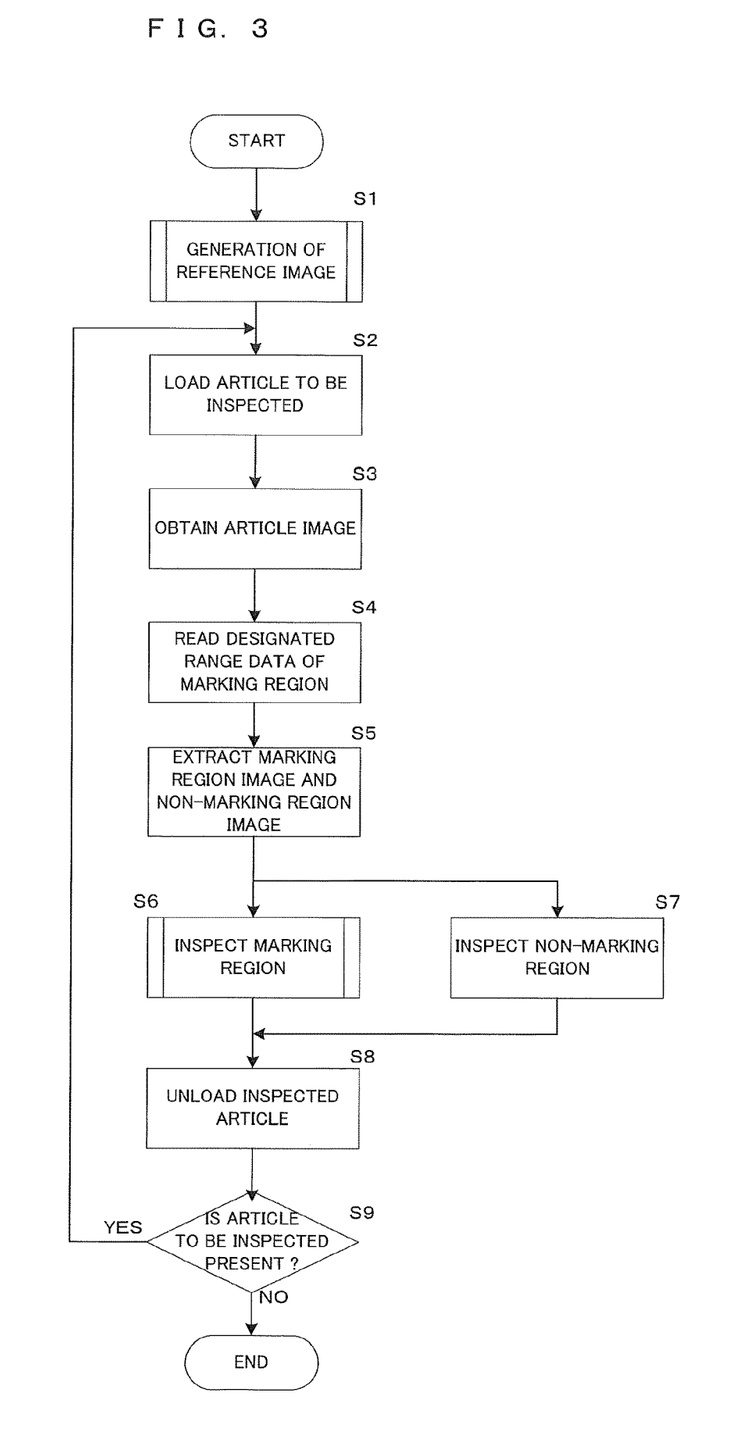
FIG. 3 is a flow chart showing the flow of an inspection process in the article inspection apparatus.
Figure 4:
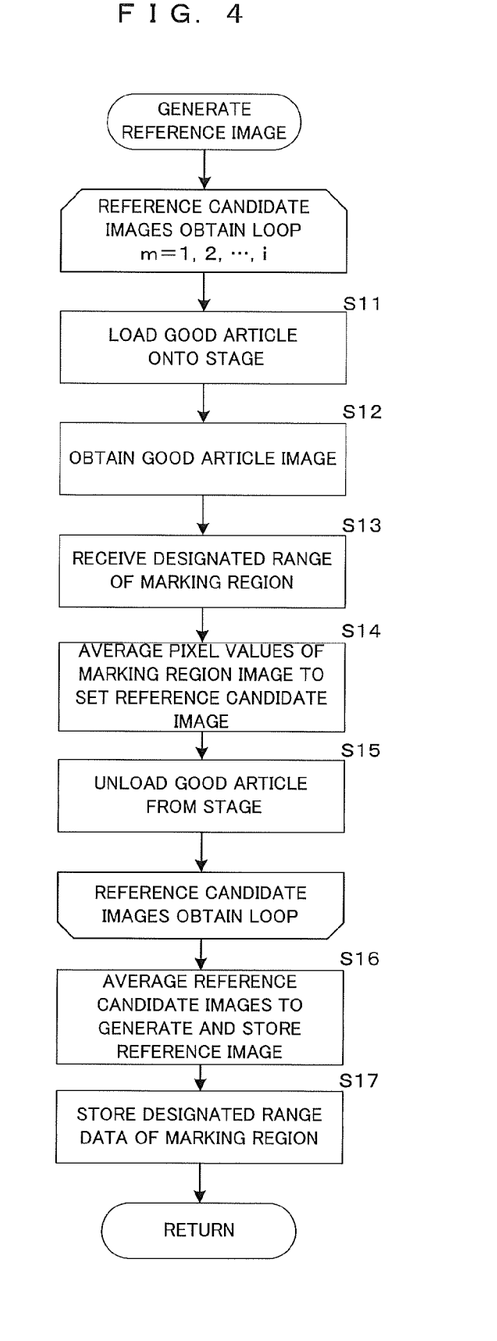
FIG. 4 is a flow chart showing a reference image generation process.

FIG. 3 is a flow chart showing the flow of an inspection process in the article inspection apparatus. Further, FIG. 4 is a flow chart showing a reference image generation process. The arithmetic processor 5 performs the following processes in accordance with the program. First, reference images are generated (Step 1) before an article W to be inspected is loaded into the article inspection apparatus 1 and inspected. That is, the reference images are generated using a plurality of good articles (i good articles in this embodiment) (Step S1) as shown in FIG. 4. Note that, since a first reference image and a second reference image are respectively obtained under the same imaging condition as a first article image and a second article image here, the generation of the first reference image corresponding to the first article image is described and the generation of the second reference image corresponding to the second article image is not described below. Further, when the first and second reference images are described without distinction, these reference images are merely referred to as "reference images". Note that the reference images may be generated in advance separately from the inspection process.

In the generation of the first reference image, a series of steps (Steps S11 to S15) is performed for each of i mutually different good articles W (see FIG. 1). Specifically, the good article W0 is loaded onto the stage 2 (Step S11). A holder (not shown) conforming to the shape, the size and the like of the good article W0 and the articles W to be inspected is provided on the stage 2, and the article W0 is held at a predetermined position on the stage 2 with a principle surface of the article W0 facing vertically upward. Subsequently, the good article W0 on the stage 2 is imaged under the same imaging condition as the first good image based on an input by an operator using the input unit 13. In this way, an image of the good article W0, i.e. a good article image G0 is obtained under a predetermined imaging condition (Step S12).

Figure 5:
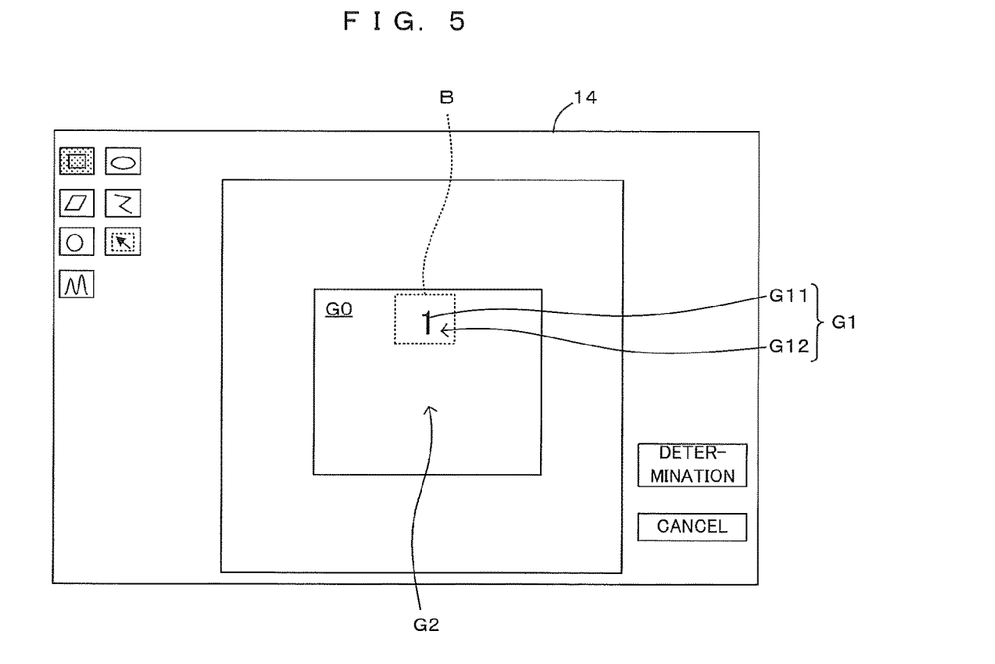
FIG. 5 is a diagram showing an example of display contents on the display in the reference image generation process.

The good article image G0 obtained in this way is displayed in a central part of the display unit 14, for example, as shown in FIG. 5, and it is seen from FIG. 5 that "1" is marked in a central upper part of the good article W0. Further, icons for designating a range, applying processings for the good article image G0 are displayed in a left upper part of the display unit 14. For example, if the operator clicks the icon showing a rectangular frame (dotted icon), a dotted-line frame for designating a marking region is additionally displayed on the good article image G0 as shown in FIG. 5. Further, a marking region R1 (FIG. 2) can be arbitrarily adjusted by changing the position and size of the dotted-line frame B by the operation of the operator. This marking region R1 is set to include an image G11 of a marking part R11 (FIG. 2) where a marking is made. Thus, the marking region R1 includes the marking part R11 and a marking peripheral part R12 surrounding the marking part R11 as shown in FIG. 2 and the image G11 of the marking part R11 and an image (hereinafter, referred to as a "marking periphery image G12") of the marking peripheral part R12 are included in an image (hereinafter, referred to as a "marking region image G1") corresponding to the marking region R1 as shown in FIG. 5.

Figure 6:
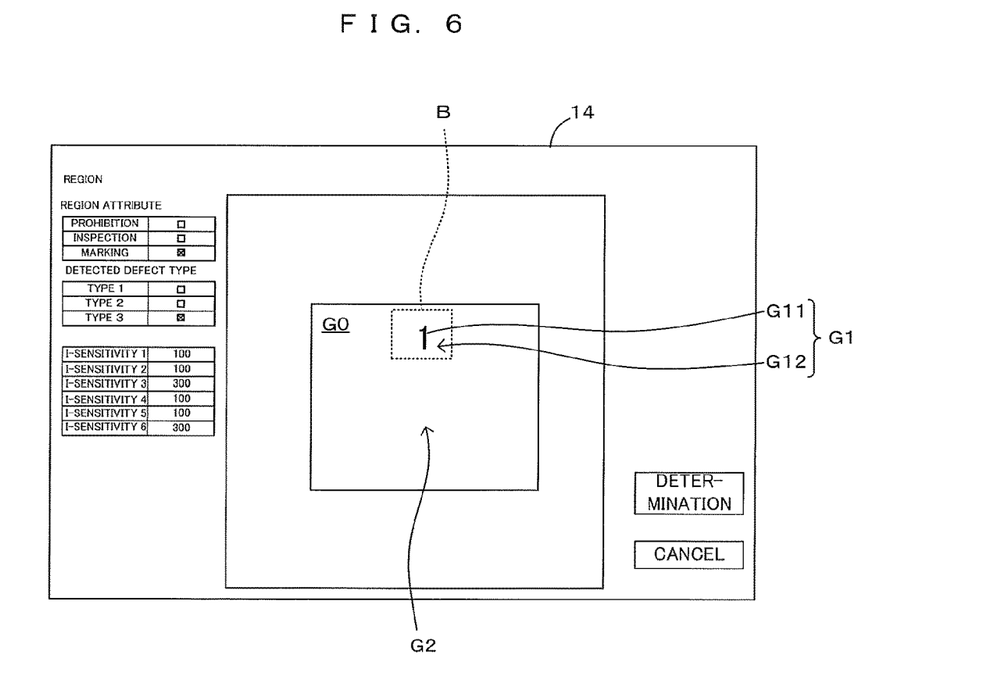
FIG. 6 is a diagram showing an example of display contents on the display in setting the inspection sensitivity of the marking region.

When the adjustment and designation of the marking region R1 are completed and a determination button is clicked by the operator, a switch is made to a screen shown in FIG. 6. That is, the icons are erased with the good article image G0 and the dotted-line frame B indicating the marking region R1 remaining, whereas boxes for designating an attribute of the region and the like are displayed on the display unit 14. In these boxes, the dotted-line frame B and the designated region can be selected to be in a prohibition region where inspection is prohibited, in an inspection region where a defect is inspected or in the marking region R1 including the marking part R11 where a marking is made. When the marking region R1 is designated, a check box "Marking" may be checked as a region attribute as shown in FIG. 6. Further, the type of a defect to be detected by inspection is selectable. Further, since there are a wide range of defects including those expressed to be relatively dark and those expressed to be relatively bright, inspection sensitivity can be set to effectively find out the defect to be detected.

If the determination button is clicked by the operator with the range of the marking region R1 designated and "Marking" selected as the region attribute as shown in FIG. 6, the arithmetic processor 5 receives the dotted-line frame B at that point of time as the designated range of the marking region R1 (Step S13). Then, designated range data indicating this range is stored in the storage 6.

Subsequently, pixel values of pixels constituting the marking region image G1 corresponding to the marking region R1 are averaged and set as a reference candidate image. Further, the data of this reference candidate image, i.e. reference candidate image data, is stored in the storage 6 (Step S14). An image of the marking part R11 is erased based on the marking periphery image G12 corresponding to the marking peripheral part R12 by the above averaging process, and the resulting image is substantially the same as an image of an article having no marking and no defect. Note that although the reference candidate image is generated by the averaging process in this embodiment, a reference image may be generated by another filtering process. Further, if the reference candidate image is obtained in this way, the good article W0 on the stage is unloaded (Step S15).

Figure 7:
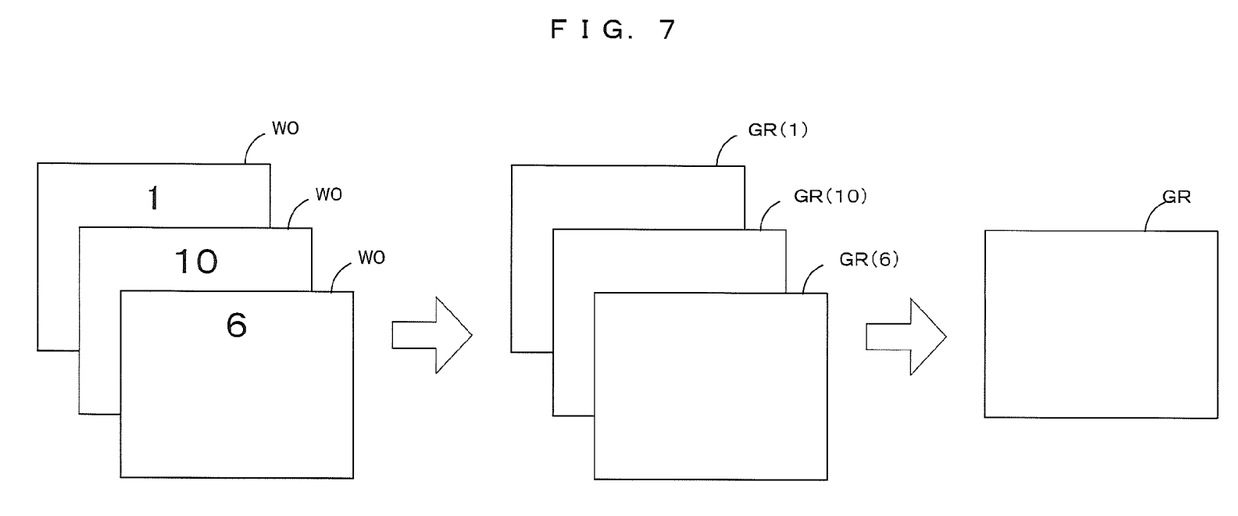
FIG. 7 is a schematic diagram showing an outline of the reference image generation process.

This series of operations is repeated by the number of the good articles W0. In this way, three reference candidate images GR(1), GR(10) and GR(6) are obtained under an imaging condition for obtaining the first article image for three good articles W0 (markings "1", "10" and "6" are respectively made thereon, but no defect is included), for example, as shown in FIG. 7. In this embodiment, these are averaged to generate a reference image GR, and the data of this reference image GR, i.e. reference image data corresponding to the first article image, is stored in the storage 6 (Step S16). Further, data indicating the designated range of the marking region R1, i.e. designated range data, is stored in the storage 6 (Step S17). Note that these processes are performed to generate the second reference image as described above.

Subsequently, if the generation of the reference images is completed, the arithmetic processor 5 performs the following processings (Steps S2 to S8) for each article W to be inspected. First, the article W to be inspected is loaded onto the stage 2 (Step S2). Subsequent to that, the article W on the stage 2 is imaged under an imaging condition suitable to obtain the first article image and imaged under an imaging condition suitable to obtain the second article image. In this way, the article image is obtained for each imaging condition, and image data thereof, i.e. article image data, is stored in the storage 6 (Step S3).

In next Step S4, the designated region data of the marking region R1 is read from the storage 6 (Step S4), and the marking region image G1 of the marking region R1 and the non-marking region image G2 of the non-marking region R2 are extracted from the article image based on this designated region data and image data of the marking region image G1 (marking region image data) and image data of the non-marking region image G2 (non-marking region image data) are stored in the storage 6 (Step S5). Note that the marking region image G1 is an image obtained by removing the designated range (part of the dotted-line frame B in FIGS. 5 and 6) by the operator from the article image G0, and the non-marking region image G2 is an image remaining after the marking region R1 is removed from the article image G0 as shown in FIGS. 5 and 6.

Then, the inspection of the marking region R1 based on the marking region image G1 (Step S6) and the inspection of the non-marking region R2 based on the non-marking region image G2 (Step S7) are performed in parallel. If these inspections are both completed, the article W to be inspected on the stage 2 is unloaded (Step S8). This series of operations (Steps S2 to S8) is repeated while the article(s) W to be inspected is/are present ("YES" in Step S9).

Out of the above inspections, the inspection of the non-marking region R2 (Step S7) is performed as in the device described in patent literature 1. Thus, this inspection is not described in detail here. On the other hand, the inspection of the marking region R1 (Step S6), which is a unique inspection conventionally not available, is described in detail with reference to FIGS. 8 and 9.

Figure 8:
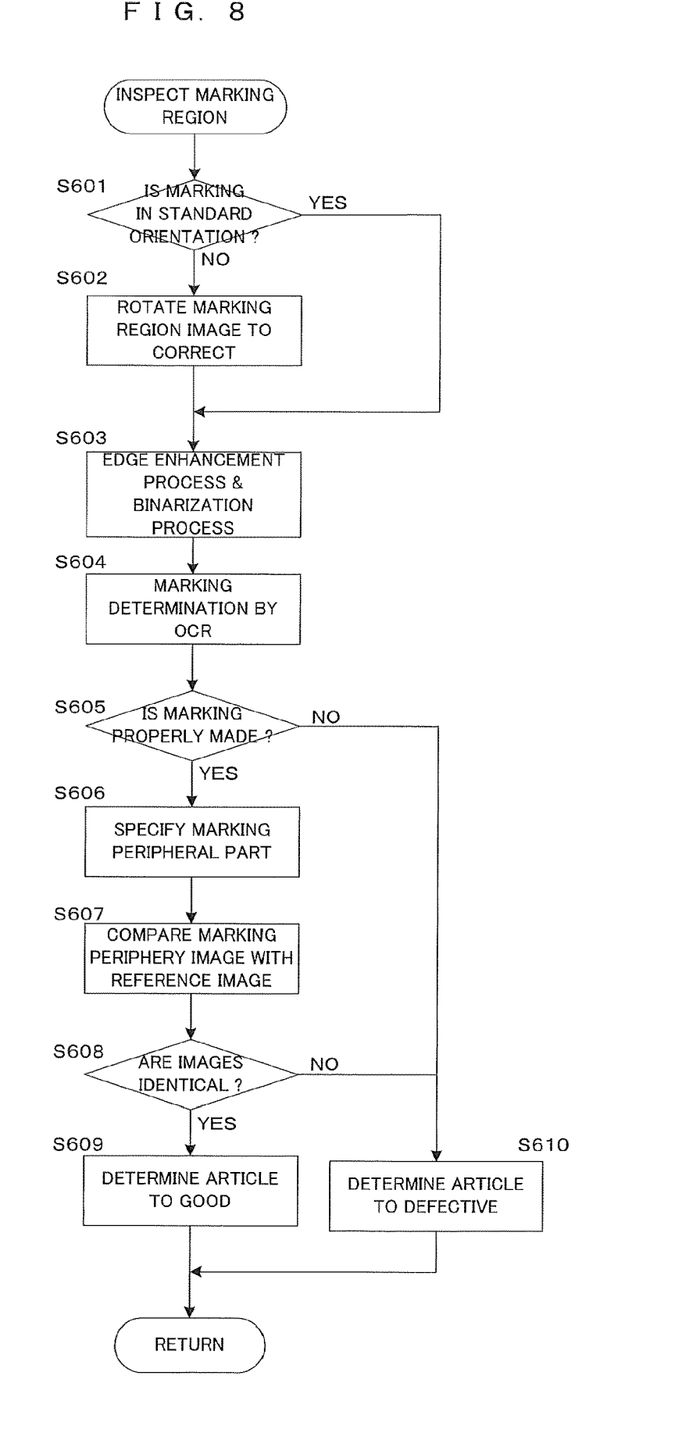
FIG. 8 is a flow chart showing an inspection procedure of the marking region.
Figure 9:
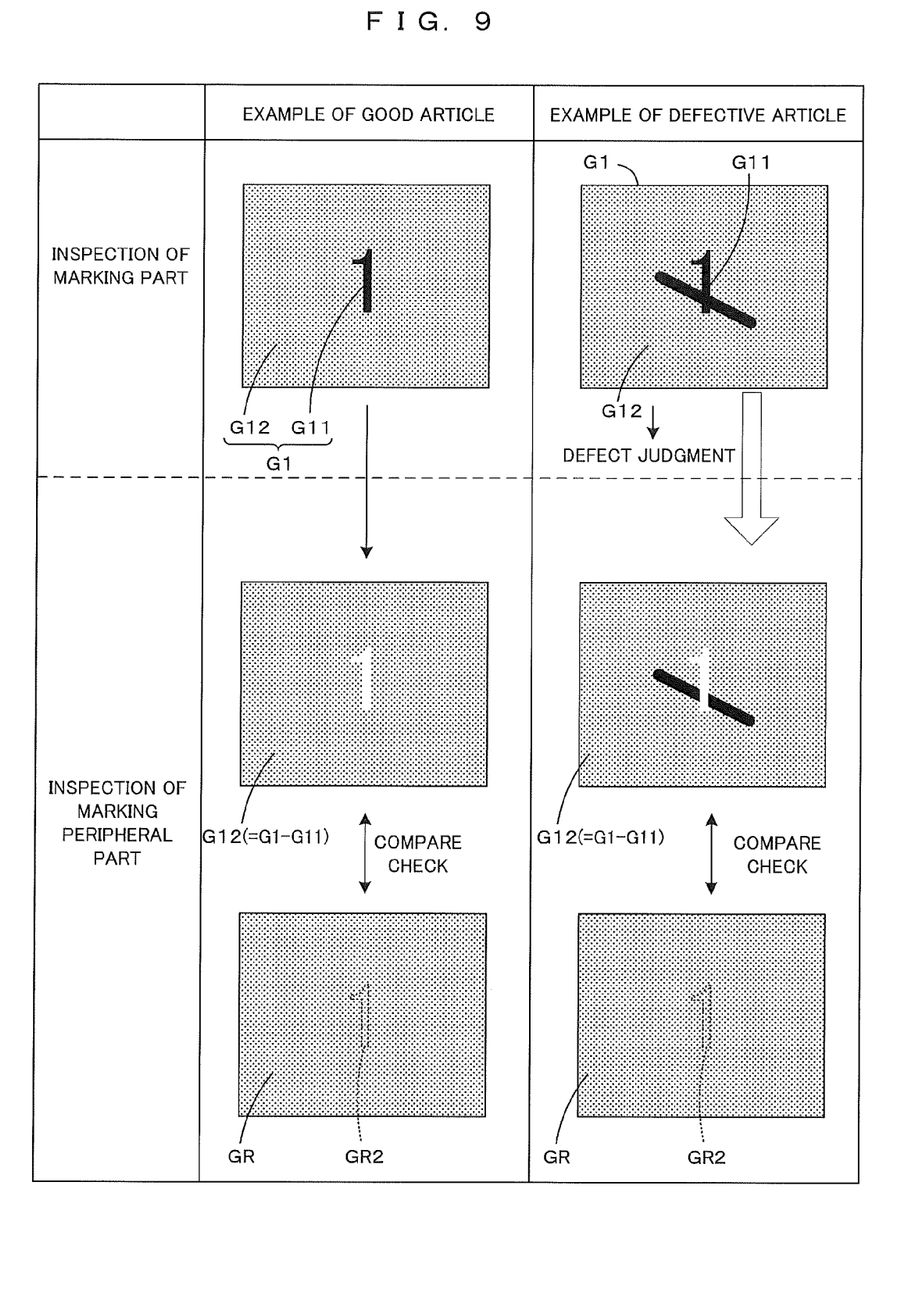
FIG. 9 is a table schematically showing inspection contents of the marking region.

FIG. 8 is a flow chart showing an inspection procedure of the marking region. Further, FIG. 9 is a table schematically showing inspection contents of the marking region. In this embodiment, the article W to be inspected is placed on the stage 2 by an unillustrated robot. Thus, the orientation of the marking made on the article W may be different from a standard orientation (the marking is facing forward in the article image G0 as shown in FIGS. 5 and 6 in the standard orientation in this embodiment) depending on an arm posture and the orientation of the article W when the robot picks up the article W. Accordingly, to satisfactorily perform optical character recognition to be described later, whether or not the marking is in the standard orientation, i.e. whether or not the marking is facing forward is determined in Step S601. If it is determined that the marking is not facing forward ("NO" in Step S601), advance is made to next Step S603 after the marking region image G1 extracted in Step S5 is rotated to be corrected so that the marking is facing forward, for example, as shown in FIG. 9 (Step S602). On the other hand, if the marking is facing forward ("YES" in Step S601), advance is directly made to Step S603.

In Step S603, after an edge enhancement process is applied to the marking region image G1 in which the marking is facing forward, the marking region image G1 is binarized, using a predetermined threshold value. In the marking region image G1 subjected to such image processings, a boundary between the marking part R11 and the marking peripheral part R12 becomes clearer and the marking clearly appears. Then, the marking is determined by performing the optical character recognition for the thus binarized marking region image G1 (Step S604). More specifically, it is determined that the marking is properly provided in the case of satisfying such a determination condition that a total number of pixels included in a part determined to be the marking part R11 by the optical character recognition is equal to or more than a certain value (e.g. 200 pixels) and a width of a part corresponding to a line segment is equal to or less than a certain width (e.g. 45 pixels). On the other hand, if the determination condition is not satisfied, it is determined that the marking is not properly provided.

If it is determined that the marking is properly made on the article W as described above ("YES" in Step S605), the arithmetic processor 5 inspects the marking peripheral part R12 in the following manner (Steps S606 to S610). Specifically, as shown in a row "Inspection of Marking Peripheral Part" of FIG. 9, the marking periphery image G12 of the marking peripheral part R12 is specified by removing the image G11 of the marking part R11 from the marking region image G1 (Step S606). Then, the marking periphery image G12 is compared to the reference image GR except a part equivalent to the marking part R11 to inspect the identity of the images (Step S607). This is because, if no defect is included in the marking peripheral part R12 of the article W to be inspected, the image GR2 excluding the image GR1 (dotted-line part) equivalent to the marking part R11 from the reference image GR and the marking periphery image G12 match or substantially match in a range corresponding to the marking region R1. Conversely, if any defect is included in the marking peripheral part R12 of the article W to be inspected, these images largely differ in a part equivalent to the defect. Accordingly, in this embodiment, a difference of the pixel value of each pixel constituting each image is obtained and it can be concluded that the both images match and no defect is included in the marking peripheral part R12, for example, as shown in a column "Example of Good Article" of FIG. 9 when a cumulative value of those differences is equal to or less than a predetermined threshold value. Conversely, when the cumulative value exceeds the threshold value, it can be concluded that a defect is included in the marking peripheral part R12, for example, as shown in a column "Example of Defective Article" of FIG. 9. Accordingly, in this embodiment, it is determined in Step S608 whether or not the marking periphery image G12 is substantially identical to an image corresponding to the marking periphery image G12 in the reference image GR (image obtained by removing the image GR2 of the dotted-line part from the reference image GR). The article W on the stage 2 is determined to be a good article (Step S609) if these images are identical, whereas the article W is determined to be a defective article if these images are not identical (Step S610).

On the other hand, if it is determined in Step S605 that the marking is not properly made on the article W, the arithmetic processor 5 immediately determines that the article W on the stage 2 is a defective article without inspecting the marking peripheral part R12 (Step S610).

As described above, in this embodiment, the marking region image G1 corresponding to the marking region R1 is obtained from the article image G0 obtained by imaging the article W to be inspected. Then, whether or not the marking is properly provided is determined by performing the character recognition of the marking part R11 for the marking region image G1. Not only such a marking inspection, but also the marking periphery image G12 obtained by removing the image G11 of the marking part R11 from the marking region image G1 is compared to the image GR2 in the reference image GR and whether or not any defect is included in the marking peripheral part R12 is determined based on the comparison result. Thus, the marking region R1 including the marking part R11 where the marking is made on the surface of the article W can be accurately inspected.

Further, in the above embodiment, if it is determined that the marking is not properly made, the inspection of the marking peripheral part R12 is omitted and the article W to be inspected is immediately recognized to be a defective article. Thus, useless inspection processes (Steps S606 to S609) can be omitted.

Further, since the inspection of the marking region R1 (Step S6) and the inspection of the non-marking region R2 (Step S7) are performed in parallel in this embodiment, the article W including the marking region R1 can be inspected in a short time. Note that the inspections may be performed perfectly in parallel or may be performed partially in parallel. That is, the inspection of the non-marking region R2 may be performed in parallel with at least one of the marking determination by the character recognition of the marking part R11 and the determination on the presence or absence of any defect in the marking peripheral part R12 based on the marking periphery image G12.

Further, in the above embodiment, the operator can designate the marking region R1 while viewing the article image G0 displayed on the display unit 14. Thus, the marking region R1 can be set according to the type, the size and the like of the marking and the article W can be accurately inspected.

As described above, in the above embodiment, the good article W0 corresponds to an example of an "article having no defect" of the invention, and the article W corresponds to an example of an "article to be inspected" of the invention. Further, the upper imager 31, the oblique imagers 32 and the lateral imagers 33 correspond to an example of an "imager" of the invention, and the storage 6 corresponds to an example of a "reference image storage" of the invention.

Further, these components and the arithmetic processor 5 functioning as the marking determiner 52 and the marking periphery determiner 53 cooperate to function as a "marking inspection device" of the invention.

Note that the invention is not limited to the above embodiment and various changes other than the aforementioned ones can be made without departing from the gist of the invention. For example, in this embodiment, whether or not the marking is properly provided is determined based on the pixel information of the part determined to be the marking part R11 by the optical character recognition. However, whether or not the marking is properly provided may be determined based on a determination condition other than the above. For example, in the optical character recognition method conventionally frequently used, a character recognition result is shown by a score and it is determined that the marking is properly provided if the score is equal to or higher than a specific value, whereas it is determined that the marking is not properly provided if the score is below the specific value. Further, whether or not the marking is proper may be determined based on a combination of the above pixel information and the score.

Further, in the optical character recognition, a plurality of character candidates may be shown as a recognition result together with the score. In the case of employing such character recognition, it may be recognized that the character candidate having a highest score (i.e. most approximate character candidate) is marked on the article W. As shown by an outlined white arrow in FIG. 9, even if it is determined based on the pixel information that the marking is not properly provided, it may be determined that the most approximate character candidate was marked and the marking peripheral part R12 may be inspected (Steps S606 to S610) (second embodiment). According to this second embodiment, the following functions and effects are achieved. Even if a relatively small and tiny defect not problematic in practical use is present adjacent to the marking part R11, it may be determined based on the pixel information that the marking will not be properly made. In contrast, according to the second embodiment, character recognition can be performed even if a tiny defect is present and inspection conforming to practical use can be made.

Further, although the image of the article having no marking and no defect, i.e. the reference image GR, is generated using the plurality of good articles W0 in the above embodiment, the reference image GR may be generated using only one good article W0. Further, the reference image GR may be generated, using an article having no marking and no defect, instead of the good article(s) W0. In this case, the reference image GR can be immediately obtained by imaging this article.

Note that an application target of the invention is not limited to the device described in patent literature 1, and the invention can be applied to article inspection apparatuses in general for inspecting an article having a marking made on a part of a surface.

Although the invention has been described by way of the specific embodiments above, this description is not intended to be interpreted in a limited sense. By referring to the description of the invention, various modifications of the disclosed embodiments will become apparent to a person skilled in this art similarly to other embodiments of the invention. Hence, appended claims are thought to include these modifications and embodiments without departing from the true scope of the invention.

INDUSTRIAL APPLICABILITY

The invention is generally applicable to marking inspection techniques for inspecting a marking region including a marking part where a marking is made on a surface of an article, and an article inspection apparatus equipped for inspecting an article.

REFERENCE SIGNS LIST

1 article inspection apparatus
5 arithmetic processor
6 storage
31 upper imager
32 oblique imager
33 lateral imagers
51 reference image generator
52 marking determiner
53 marking periphery determiner
54 non-marking region determiner
G0 article image
G1 marking region image
G2 non-marking region image
G11 image (of the marking part)
G12 marking periphery image
GR reference image
R11 marking part
R12 marking peripheral part
W article (to be inspected)
W0 good article

The invention claimed is:

1. A marking inspection device for inspecting a marking region including a marking part where a marking for specifying an article is made, out of a surface of the article, the device comprising:
 a reference image storage that stores an image of a reference article having no marking and no defect as a reference image;
 an imager configured to image the article; and
 at least one processing unit configured to:
  obtain a marking region image by cutting out a part corresponding to the marking region from an article image obtained by imaging the article to be inspected by the imager;
  determine whether or not the marking is properly provided by performing character recognition of the marking part for the marking region image; and
  determine whether or not any defect is included in a marking peripheral part except the marking part, out of the marking region, by comparing a marking periphery image obtained by removing an image of the marking part from the marking region image to the reference image.

2. The marking inspection device according to claim 1, wherein:
 the at least one processing unit is configured so as not to determine whether or not the defect is included when determining that the marking is not properly provided.

3. The marking inspection device according to claim 1, wherein:
 the at least one processing unit is configured to
 obtain a character candidate most approximate to the marking part by the character recognition, and
 determine whether or not the defect is included, using an image of the character candidate as the image of the marking part.

4. The marking inspection device according to claim 1, wherein:
 the at least one processing unit is configured to perform the character recognition after applying an enhancement processing for enhancing the marking part with respect to the marking region image and applying a binarization processing.

5. The marking inspection device according to claim 1, comprising:

the at least one processing unit is configured to generate the reference image by erasing an image of the marking region, out of a good article image obtained by imaging an article having no defect by the imager, based on the marking periphery image.

6. A marking inspection method for inspecting a marking region including a marking part where a marking for specifying an article is made, out of a surface of the article, the method comprising:

generating an image of a reference article having no marking and no defect as a reference image and storing the reference image in a reference image storage;

obtaining an article image by imaging the article to be inspected;

obtaining a marking region image by cutting out a part corresponding to the marking region from the article image;

determining whether or not the marking is properly provided by performing character recognition of the marking part for the marking region image; and determining whether or not any defect is included in a marking peripheral part except the marking part, out of the marking region, by comparing a marking periphery image obtained by removing an image of the marking part from the marking region image to the reference image.

7. An article inspection apparatus for inspecting an article having a marking made on a part of a surface, comprising:

a reference image storage that stores an image of a reference article having no marking and no defect as a reference image;

an imager configured to image the article; and at least one processing unit configured to:

obtain a marking region image by cutting out a part corresponding to a marking region including a marking part where the marking is made from an article image obtained by imaging the article to be inspected by the imager;

determine whether or not the marking is properly provided by performing character recognition of the marking part for the marking region image;

determine whether or not any defect is included in a marking peripheral part except the marking part, out of the marking region, by comparing a marking periphery image obtained by removing an image of the marking part from the marking region image to the reference image;

obtain a non-marking region image corresponding to a non-marking region except the marking region, out of the article; and determine whether or not any defect is included in the non-marking region by comparing the non-marking region image and the reference image.

8. The article inspection device according to claim 7, wherein:

the at least one processing unit is configured to determine whether or not any defect is included in the non-marking region in parallel with at least one of determination of whether or not the marking is properly provided, and determination of whether or not any defect is included in a marking peripheral part except the marking part, out of the marking region.

* * * * *